United States Patent

Rinkewich

[15] 3,667,685
[45] June 6, 1972

[54] IRRIGATION DEVICES

[72] Inventor: Isaac Rinkewich, New York, N.Y.
[73] Assignee: Rinko Irrigation Systems, Inc., New York, N.Y.
[22] Filed: Apr. 6, 1970
[21] Appl. No.: 25,677

[52] U.S. Cl..........................239/542, 239/450, 239/553.5, 239/590.5
[51] Int. Cl.......................................B05b 15/00
[58] Field of Search............239/450, 542, 553.5, 590, 590.3, 239/590.5

[56] References Cited

UNITED STATES PATENTS

| | | | |
|---|---|---|---|
| 3,221,996 | 12/1965 | Emmert et al. | 239/542 |
| 3,199,791 | 8/1965 | Chapin | 239/450 X |
| 1,883,656 | 10/1932 | Estock | 239/542 |
| 2,693,391 | 11/1954 | Manseau | 239/590.3 X |
| 3,438,711 | 4/1969 | Hell | 239/590 X |

FOREIGN PATENTS OR APPLICATIONS

| 1,514,437 | 1/1968 | France | 239/450 |
|---|---|---|---|

*Primary Examiner*—M. Henson Wood, Jr.
*Assistant Examiner*—Reinhold W. Thieme
*Attorney*—Blum, Moscovitz, Friedman & Kaplan

[57] ABSTRACT

An irrigation device effecting drip action of water fed from a central tube by effecting a substantial pressure drop along the path of the water as it flows from the central feed tube to the exit of the device. The flow path of the water is labyrinthine so that the water path continuously reverses in order to create substantial turbulence to maintain in suspension the foreign matter to minimize the likelihood of clogging. The labyrinthine path causes the water to travel a considerable distance, thereby increasing the pressure drop so that the water drips at a slow rate.

12 Claims, 15 Drawing Figures

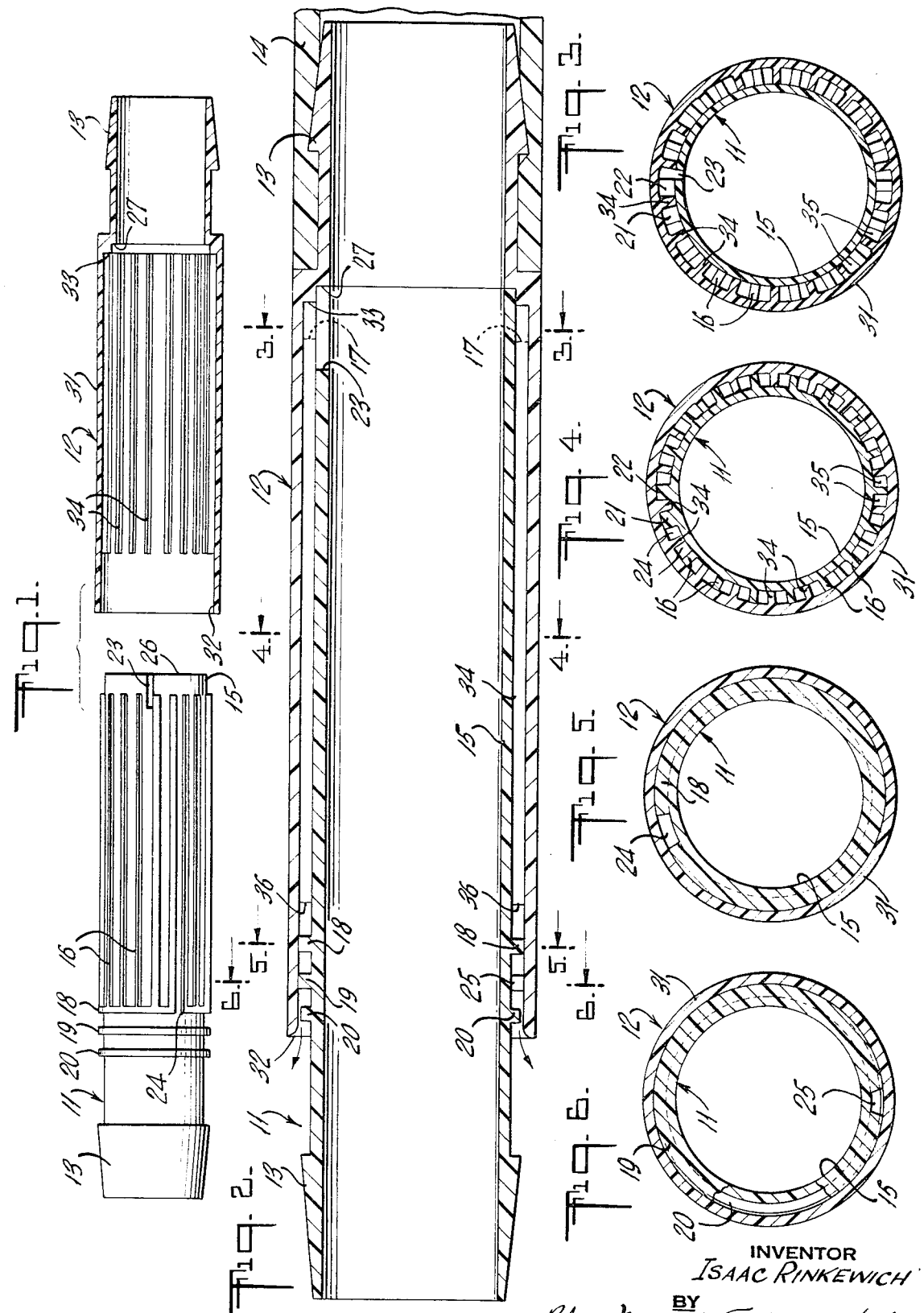

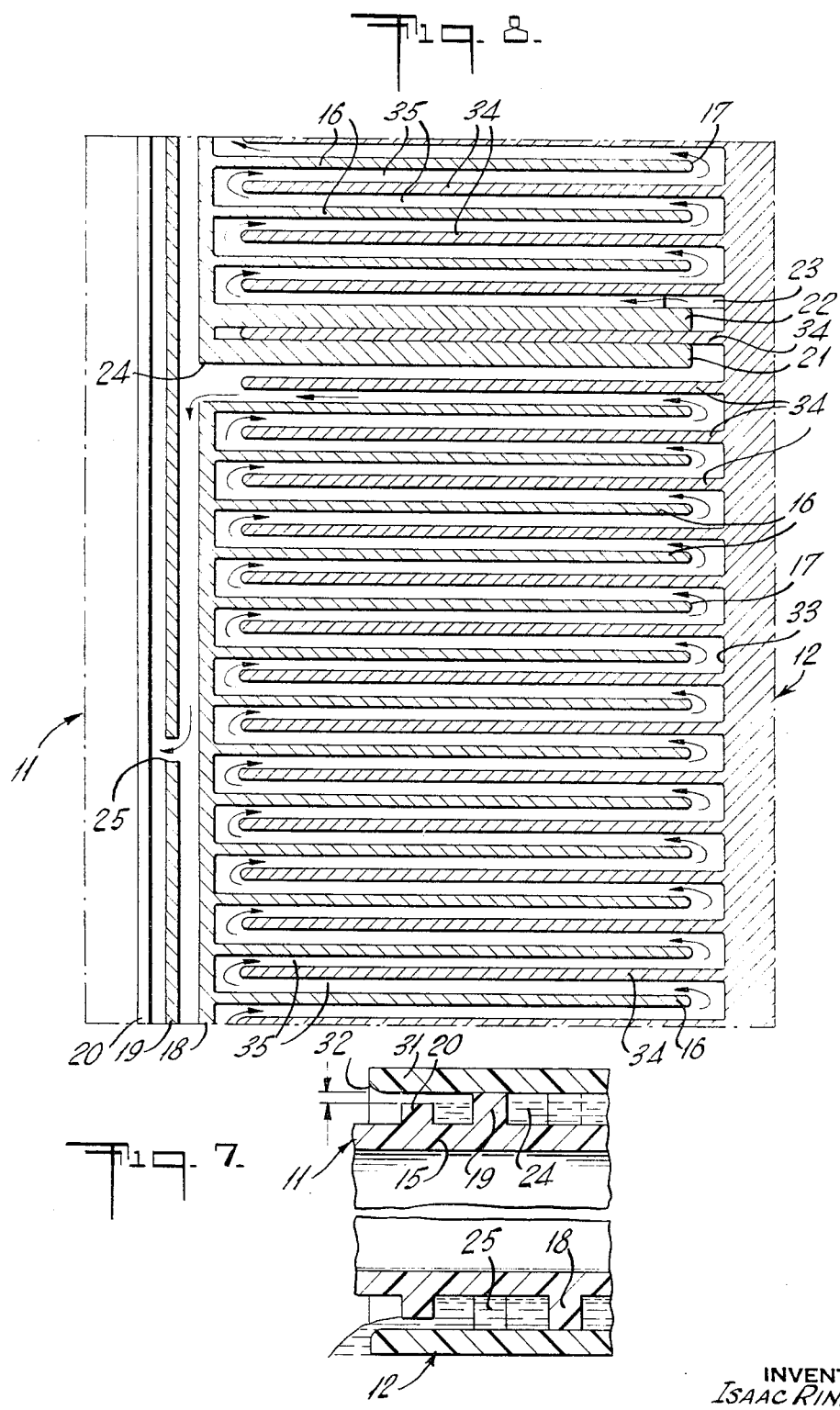

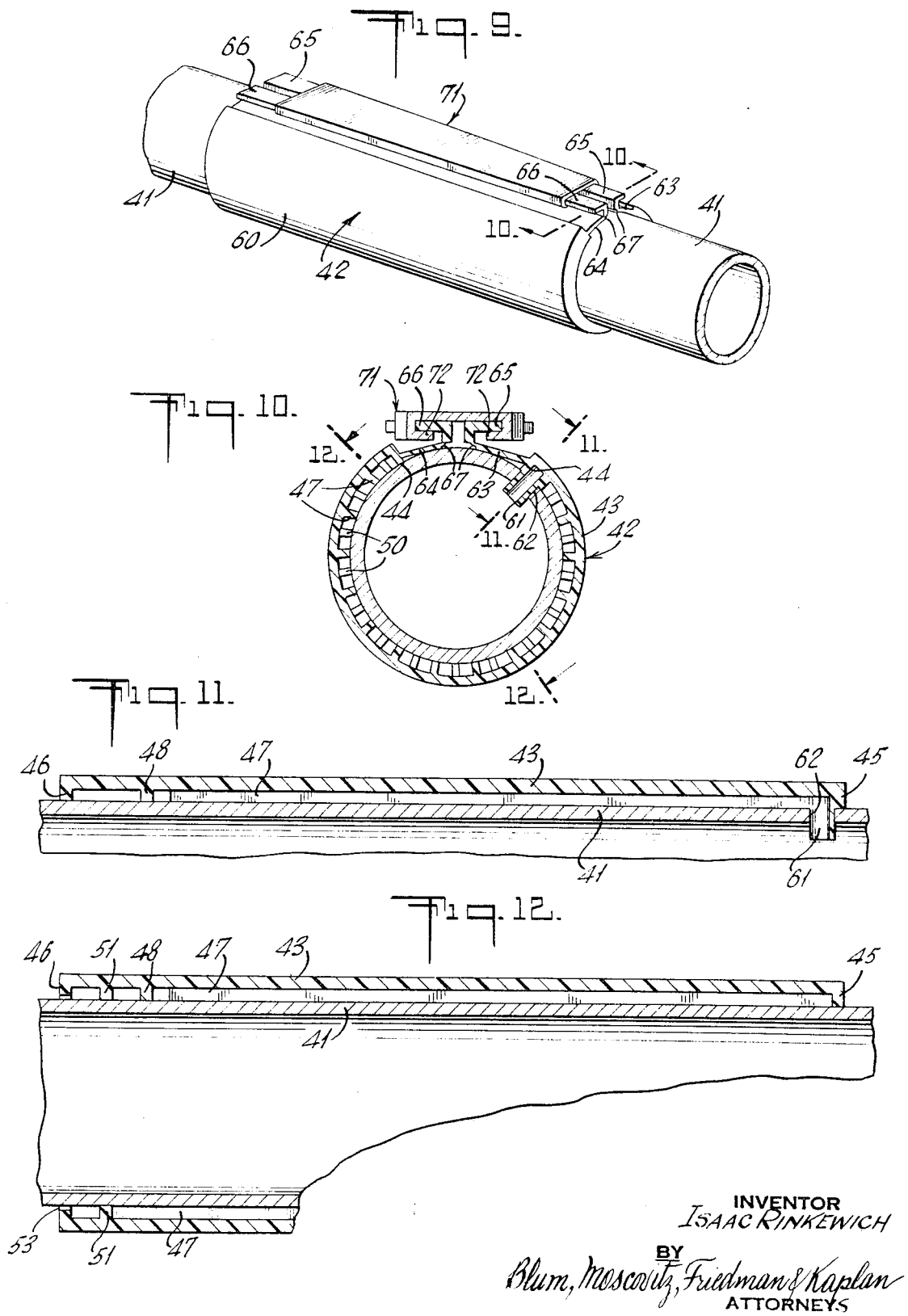

INVENTOR
ISAAC RINKEWICH

3,667,685

IRRIGATION DEVICES

BACKGROUND OF THE INVENTION

This invention relates generally to an irrigation device or irrigation nozzle which can be placed at spaced locations along a length of pipe carrying water, with or without fertilizer, to and along the fields to be irrigated. The device or nozzle operates on the basis of drip-feed so that water is directed to the root zone and loss from evaporation and wind effect is minimized.

Drip-feed nozzles or devices are known in the art but the prior art devices generally suffer from a variety of defects in operation. The defect in operation most usually encountered with irrigation nozzles is the defect of clogging. Obviously, water flowing in the feed line has foreign matter suspended therein. Such foreign matter can be dirt, minerals and other chemicals which are normally found in the feed water or can be in the form of fertilizer introduced into the feed line for fertilizing the soil during irrigation thereof.

In order for the water to drip from the nozzle when the water in the supply line is under reasonably high pressure, the outlet aperture must necessarily be of small size. If a build-up of solid particles is permitted to take place, the nozzle can quickly become clogged and the soil in the area of the clogged nozzle will not be irrigated. Since it is conceivable that several hundred acres will be irrigated at a single time, it is substantially an impossibility to monitor the functioning of the various nozzles at all times. In arid areas, the lack of irrigation in a particular area can quickly result in retarded growth or failure of the plant life being irrigated and thus the optimum nozzle is designed to approach the elimination of the likelihood of clogging.

In use, drip-feed nozzles of the type being discussed herein usually lie near the surface of the soil and an additional risk of clogging is presented by the roots and growth which may surround the nozzle. In fact, certain irrigation nozzles may be installed below ground level where clogging by roots is an ever present danger. With such added factor of clogging, the design and construction of a reliable nozzle has presented substantial difficulties.

SUMMARY OF THE INVENTION

Generally speaking, in accordance with the invention, a drip feed irrigation device or nozzle is provided which permits water to drip therefrom from a feed or supply line. The water travels a relatively long path through the device and the friction resulting from the length of travel between the inlet and outlet of the device effects a substantial pressure drop across the device so that water fed into the device at a substantially high pressure will drip from the outlet.

The device is composed of a plurality of continuous reverse passages to create substantial turbulence in the water flowing through the device and the turbulence prevents a build-up of foreign matter in the device by maintaining such foreign matter in suspension. The turbulence also increases the pressure drop across the device to further aid the drip feed effect.

The device of the instant invention may be designed for various manners of installation in the main supply line. In one of the disclosed preferred embodiments, the device is designed to be connected directly into and as part of the supply line to form a serial type of arrangement. In another disclosed embodiment, the device may be assembled as an envelope externally of the supply line so that the device can be readily removed and replaced if it becomes unserviceable for any reason without requiring disassembly of the supply line.

Accordingly, it is an object of this invention to provide an improved type of irrigation device for drip feed, which reduces the likelihood of clogging.

Another object of the invention is to provide an improved long-passage irrigation device which imparts turbulence to the fluid flowing therethrough.

A further object of the invention is to provide an improved irrigation drip-feed device which can be readily replaced if it becomes unserviceable.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an exploded, elevational view of an irrigation device constructed in accordance with a preferred embodiment of the instant invention;

FIG. 2 is a sectional, elevational view, at an enlarged scale, of the device of FIG. 1;

FIG. 3 is a sectional view taken along line 3—3 of FIG. 2;

FIG. 4 is a sectional view taken along line 4—4 of FIG. 2;

FIG. 5 is a sectional view taken along line 5—5 of FIG. 2;

FIG. 6 is a sectional view taken along line 6—6 of FIG. 2;

FIG. 7 is an enlarged sectional view of the exit end of the device of FIG. 2;

FIG. 8 is a developed view of the device of FIG. 2 showing the path traversed by the water from inlet to outlet;

FIG. 9 is a perspective view of an irrigation device constructed in accordance with another embodiment of the instant invention;

FIG. 10 is a sectional view taken along line 10—10 of FIG. 9;

FIG. 11 is a partial sectional view taken along line 11—11 of FIG. 10;

FIG. 12 is a partial sectional view taken along line 12—12 of FIG. 10;

DESCRIPTION OF THE PREFERRED EMBODIMENTS

Figure 13:
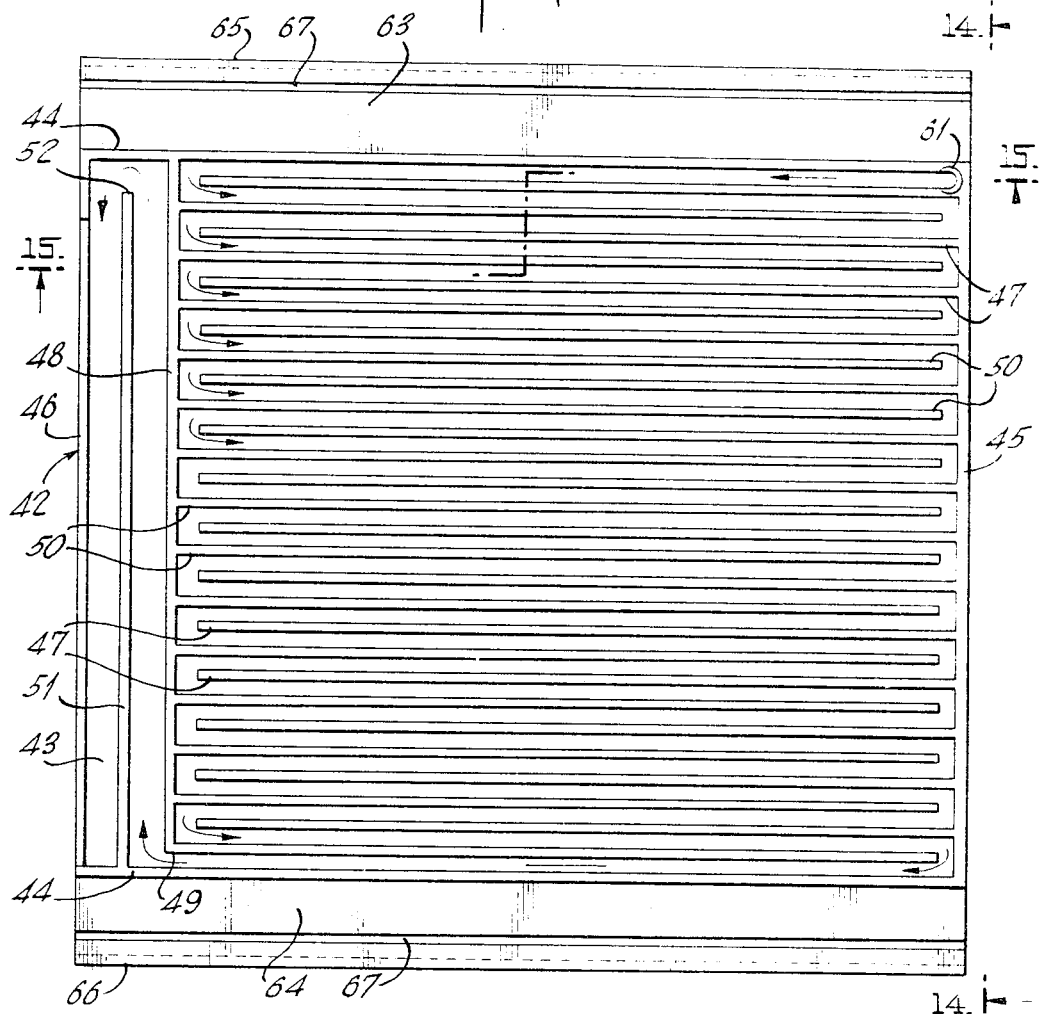
FIG. 13 is a developed view of the device of FIG. 9 showing the path of flow from inlet to outlet.
Figure 14:
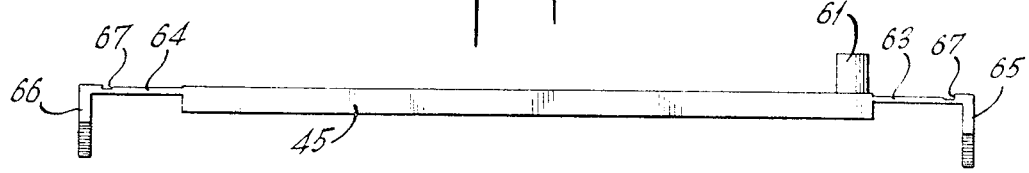
FIG. 14 is an end view of the device of FIG. 13, looking in the direction of arrows 14—14.

Referring now to FIGS. 1 and 2, an inner sleeve 11 is adapted to be assembled with an outer sleeve 12 to form the completed irrigation device shown in sectional view in FIG. 2. The sleeves form a through passage for assembly in line in an irrigation system. The sleeves are preferably formed of a plastic material so as to be lightweight and generally inert to the elements and each of the inner and outer sleeves is provided with a tapered flange 13 for assembling the device to the ends of an irrigation pipe 14 so that the device becomes a part of the supply line and water travels continually therethrough. The devices are placed at spaced intervals along the supply line and the spacing of the devices will depend on the arrangement of crops to be irrigated.

Inner sleeve 11 is formed with a circumferential wall 15 which extends the entire length of the inner sleeve and a plurality of ribs 16 extend radially outwardly from and as an integral part of circumferential wall 15. All ribs 16 are of equal length to define an outside diameter of the inner sleeve and the ribs extend from a point 17 spaced from one end of inner sleeve 11 to a first annular flange 18 to which each of the ribs is joined with the outside diameter of the first annular flange being substantially that of the outside diameter of the inner sleeve defined by the ribs. As best seen in FIG. 3, first ribs 16 are equally spaced about the periphery of wall 15 except for a pair of adjacent ribs 21 and 22 which have a closer spacing for a purpose to be hereinafter described.

A slot 23 is provided through wall 15 adjacent rib 22. First annular flange 18 is also shown in FIG. 5 and an aperture 24 extends through first annular flange 18 at a location adjacent the connection of rib 21 to the first annular flange.

A second annular flange 19 (FIGS. 2 and 6) extends outwardly from circumferential wall 15 and is axially spaced from first annular flange 18. The outside diameter of the second annular flange is substantially that of the first annular flange and a second aperture 25 extends through first annular flange 19 substantially diametrically opposed to the location of first aperture 24 (FIG. 5).

Referring now to FIGS. 2 and 7, a third annular flange 20 extends radially outwardly from circumferential wall 15 around the periphery of the wall and the outside diameter of the third annular flange is less than the outside diameter of the first and second annular flanges, whereby to provide a space between the third annular flange and the interior wall of outer sleeve 12 as indicated by the arrows shown in FIG. 7.

Outer sleeve 12 is also provided with a circumferential wall 31 whose inside diameter is substantially the same or slightly less than the outside diameter of first ribs 16 and first and second annular flanges 18 and 19, whereby a tight friction fit is provided when outer sleeve 12 is assembled over inner sleeve 11 as shown in FIG. 2. Circumferential wall 31 has an open outer end 32 and a closed inner end defined by a flange 33 which may include an undercut 27 formed between circumferential wall 31 and the connection of the outer sleeve to the irrigation pipe in the area of tapered flange 13. A plurality of second ribs 34 extend radially inwardly from wall 31 at substantially equally spaced intervals throughout the entire inner circumferential surface of wall 31. The height of second ribs 34 is substantially equal to the height of first ribs 16 and first and second annular flanges 18 and 19, so that the ends of second rib 34 make intimate frictional contact with the outer surface of circumferential wall 15 when the inner and outer sleeves are assembled, as shown in FIG. 2. In the assembled position, the outer end 26 of wall 15 engages with flange 33 and undercut 27 in substantially watertight relationship and it will be seen that, in the assembled condition, a through passage of substantially constant diameter, is defined for connection of the irrigation device to the irrigation pipe assembled at the opposite ends of the device.

As best seen in FIGS. 3 and 4, each of the second ribs 34 is equally spaced between adjacent first ribs 16 to provide a plurality of passages between each adjacent first and second ribs. The spacing of adjacent ribs 21 and 22 on the inner sleeve is substantially that of the thickness of one of the second ribs 34, as shown in FIG. 3, so as to guide the outer sleeve with respect to the inner sleeve during assembly to assure that all of the other ribs 34 are located substantially midway between the ribs 16 to define the passages identified as 35.

Each of second ribs 34 terminates at a point 36 spaced from first annular flange 18 to define a passage around the end of each of second ribs 34 and, in similar fashion, the termination point 17 of the first ribs defines a passage around the end of the first ribs between the end of each first rib and flange 33.

With the above construction, the inner and outer sleeves may be assembled together by a press or friction fit to define between the walls of the inner and outer sleeves a continuous passage which constantly reverses direction as it winds its way in a circumferential direction. The main water supply flows through irrigation pipe 14 under pressure and the direction of flow is of no significance. The water flowing through the irrigation device enters the labyrinth of passages through slot 23 and drips from the device through the space formed between third annular flange 20 and the interior of circumferential wall 31, as seen in FIG. 7.

A developed view of the labyrinth is shown in FIG. 8 for clarity of understanding. Water enters the labyrinth through slot 23 and travels along the passage formed between adjacent first and second ribs, reversing 180° at the end of the ribs. The water can flow only in the direction of the arrow indicated at slot 23 as a result of the close fit between adjacent ribs 21 and 22 and one of the second ribs 34 which act to close the labyrinth in one direction and also act to properly space all of the other ribs. As shown in FIG. 8, the water flows in through slot or opening 23, and travels in the direction of the arrows which go off the figure at the top of FIG. 8 and come in at the bottom of FIG. 8 and continue in a constantly reversing path until the water has traveled about the circumference a distance which is 360° less the arcuate distance occupied by adjacent ribs 21 and 22. The water thereafter flows into the space between first and second annular flanges 18 and 19 through first aperture 24 and the water can then flow in either direction around the circumference of the channel defined by first and second flanges 18 and 19 until the water reaches second aperture 25 in second annular flange 19, whereupon the water flows into the circumferential annular space between third annular flange 20 and second annular flange 19. The water then drips out of the irrigation device over third annular flange 20 as a result of the smaller outside diameter of the third annular flange and the spacing between the third annular flange and the inner surface of circumferential wall 31.

By the above construction, a short length provides an extremely long path for water flow and the small cross-section of the path and its length provide for substantial friction resulting in a considerable pressure drop between the interior of the device and the discharge of the device so that water in the area of 14 to 20 PSI in the supply line will no more than drip from the irrigation device. By way of example, but without limitation, the interior wall of the irrigation device will have a size or diameter of about three-quarter inch for most irrigation applications and the spacing between the outer end of third annular flange 20 and the inner surface of circumferential wall 31 will preferably be 0.020 inch.

The water flowing through the labyrinth will be maintained in a constant state of turbulence as the result of the constant reversal of the flow passage. The turbulence results in an increase in the friction between the water and the walls of the passages to further amplify the pressure drop across the device, thereby adding to the drip nature of the output. Also, the turbulence aids in maintaining in suspension the foreign matter that is likely to be present in the water. For example, during irrigation, it may be desirable to introduce fertilizer into the irrigating waters, and, without turbulence, the particles of fertilizing material could build up at various locations within the irrigation device to effect a clogging of the numerous and very small passages of the irrigation device. The turbulence of the water thereby aids in preventing clogging of the device.

Another embodiment of the invention is shown in FIGS. 9 through 15, whereby a labyrinth may be formed on the external surface of the irrigation pipe by wrapping the device about the external surface of the irrigation pipe and plugging the device into the irrigation pipe to form a communication with the interior thereof.

Irrigation pipe 41 is a continuous length of plastic tubing and an irrigation device indicated generally at 42 may be attached at any position along the surface of the pipe. Irrigation device 42 is preferably formed of a flexible plastic material such as polypropylene so as to be readily flexible and readily conformable to the outside surface of the irrigation pipe. Irrigation device 42 is formed with an outside wall 43 with a plurality of extending elements for intimate engagement with the outside surface of the irrigation pipe when assembled thereto.

Referring to FIG. 13, the inside surface of irrigation device 42 is shown with the various elements formed integrally with outside wall 43. A pair of side ribs 44 extend perpendicularly from outside wall 43 in a direction parallel to the longitudinal axis of the device when in the assembled, operative position. An end rib 45 extends along one edge of the device between side ribs 44 and a second end rib 46 extends along the opposite side of the device between side ribs 44. Between the end and side ribs are a plurality of intermediate ribs forming a labyrinth path. A plurality of first intermediate ribs 47 extend from outside wall 43 in perpendicular relationship to end rib 45. A first transverse rib 48 extends from the outside wall from and perpendicular to one of side ribs 44, terminating short of the other side rib, as indicated at 49. A plurality of second intermediate ribs 50 extend from outside wall 43 in perpendicular relationship from first transverse rib 48 with the first intermediate ribs 47 being spaced between the second intermediate ribs 50 with the terminal ends of each of the first and second intermediate ribs, terminating short of the first transverse rib 48 and end rib 45, respectively, to thereby define a continuous and constantly reversing path or channel between the first and second intermediate ribs.

A second transverse rib 51 extends from the other side rib 44 in spaced parallel relationship with respect to first transverse rib 48 and the end of second transverse rib 51 terminates short of the first side rib 44 as at 52. Second transverse rib 51 is spaced between first transverse rib 48 and second end rib 46 to define a further continuous path communicating with the continuous labyrinthine path defined by the intermediate ribs.

Side ribs 44, end rib 45, first intermediate rib 47, first transverse rib 48, second intermediate rib 50, and second transverse rib 51, are all of equal height with respect to the inside surface of outside wall 43, so that the outward facing surface of each of the aforesaid ribs makes intimate contact with the outside surface of irrigation pipe 41 when irrigation device 42 is in the assembled condition as shown in FIGS. 9 and 12. However, the height of second end rib 46 is less, throughout the major portion of its length, than the height of the other ribs, whereby a space shown at 53 in FIG. 12 is provided between second end rib 46 and the outside surface of irrigation pipe 41 and such circumferential space defines the outlet through which the irrigation water drips.

A cylindrical tube 61 is molded as part of irrigation device 42 and the bore of cylindrical tube 61 communicates with the beginning of the labyrinth passages as indicated in the upper right-hand corner of the device shown in FIG. 13. Cylindrical tube 61 is inserted through a hole 62 punched through the wall of irrigation pipe 41 and it is in this manner that the water flowing through irrigation pipe 41 enters the labyrinthine passages of the irrigation device to commence its travel toward the outlet end where the water drips therefrom.

As noted above, relative to the embodiment of FIG. 9, the irrigation device can be assembled about the irrigation pipe at any position. In order to assemble the irrigation device to the irrigation pipe, it is merely necessary to pierce a hole through the wall of the irrigation pipe of sufficient size to snugly receive cylindrical tube 61. The tube is then inserted through the hole and the irrigation device is thereafter tightly wrapped about the surface of the irrigation pipe and an operative nozzle is thereby formed. The irrigation device is secured to the irrigation pipe in the manner to be now described.

Figure 15:
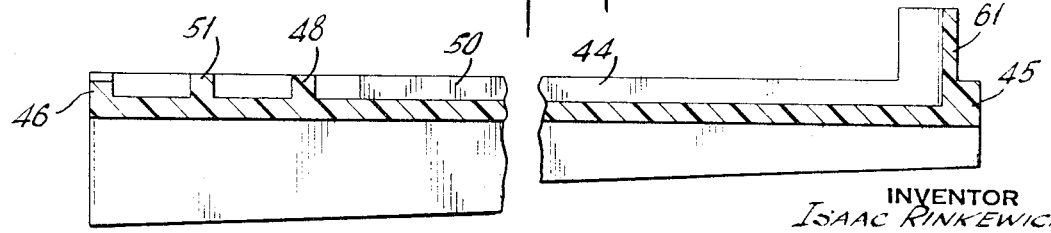
FIG. 15 is a sectional view taken along line 15—15 of FIG. 13.

A pair of tongues 63, 64 extend transversely outwardly from outside wall 43 at opposite sides of the irrigation device beyond side ribs 44. A relatively thick, L-shaped locking element 65 extends from tongue 63 and a similar locking element 66 extends from tongue 64. Located between each of tongues 63 and 64 and the relatively thick locking elements 65 and 66, is a thinned section 67 forming a "living" hinge. The long leg of each of the L-shaped relatively thick locking elements 65 and 66 is tapered as best shown in FIG. 15.

To assemble irrigation device 42 on irrigation pipe 41 after a hole has been pierced through the wall of the irrigation device and tube 61 has been plugged thereinto, the irrigation device is wrapped about the wall of the irrigation pipe with the various ribs in intimate contact with the outside wall of the irrigation device. The tongues 63 and 64 generally overlie the outside wall of the irrigation pipe and the locking elements 65 and 66 are bent 90° through the living hinge 67 to attain the position shown in FIGS. 9 and 10.

A channel-shaped locking member 71 with inwardly extending legs 72 is provided for sliding engagement with locking elements 65 and 66. Locking member 71 is tapered in the longitudinal direction in mating relationship with the taper of locking elements 65 and 66. In this manner, locking member 71 may be slid onto locking elements 65 and 66 to hold the irrigation device in contact with the surface of the irrigation pipe. By moving the locking member along the locking elements, the cooperating tapered construction results in an ever-increasing tightening of the irrigation device on the irrigation pipe, so that the various ribs will be brought into tight engagement with the surface of the irrigation pipe to prevent any leakage from the device whereby all of the water will flow into the device through tube 61 and will drip therefrom over second end rib 46.

The labyrinthine channels defined by irrigation device 42 operate in a manner similar to those described in connection with the embodiment of FIGS. 1 through 8. In other words, the long path of travel causes a pressure drop between inlet and outlet and the turbulence as a result of the multitude of path reversals adds to the friction and also maintains foreign particles in suspension to prevent the build-up of foreign particles and the resultant clogging of the irrigation device.

If, after a period of use, the irrigation device should become clogged, the construction of the device shown in FIG. 9 is especially suitable for quick replacement. It is merely necessary to slide locking member 71 off the device, unwrap the device and discard it and assemble a new device in the position of the prior device. Also, for adding irrigation devices along the length of the irrigation pipe, it is merely necessary to pierce the irrigation pipe and install a device.

The two embodiments described herein are most suitable for installation as part of a serially connected system where the water flows through the device and continues on to the next device. However, the labyrinthine-type arrangement to provide a long passage and turbulence can be embodied in devices of the type that would be connected in parallel with the irrigation pipe so that the only outlet of the irrigation device would be the drip-feed and water would not continue to flow therethrough.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An irrigation device comprising a first circumferentially extending wall, a second circumferentially extending wall spaced from and surrounding said first wall, means cooperating between said first and second walls to define a closed chamber between said first and second walls, inlet means for communicating with said closed chamber from the exterior of said device, outlet means for communicating with said closed chamber from the exterior of said device, and passage-defining means extending between said first and second walls to define a continuous passage in said chamber between said inlet and outlet means, said passage-defining means constructed and arranged to provide a plurality of longitudinally extending, adjacent, parallel conduits, all said conduits being substantially equally spaced from said first wall, each of said conduits communicating with an adjacent conduit only at one end thereof, whereby to define a passage of constantly reversing configuration along the longitudinal axis.

2. An irrigation device as claimed in claim 1 and including an inner sleeve and an outer sleeve, the outside surface of said inner sleeve and the inside surface of said outer sleeve forming said spaced walls, said inner sleeve having a first end extending beyond said outer sleeve in one direction and said outer sleeve having a first end extending beyond said inner sleeve in an opposite direction, said first ends of each of said inner and outer sleeves being provided with means for connecting said sleeves to an irrigation pipe, said passage-defining means including a plurality of ribs extending between said inner and outer sleeves.

3. An irrigation device as claimed in claim 2 wherein said outer sleeve is provided with a flange intermediate the ends thereof and said inner sleeve has a second end in engagement with said flange, said inlet means comprising a passage through the wall of said inner sleeve proximate said second end thereof.

4. An irrigation device as claimed in claim 3 wherein said outer sleeve has a second end overlying the outside surface of said first sleeve intermediate the ends thereof, said outlet means being located proximate said second end of said outer sleeve and comprising an outlet rib extending between said first and second walls in a direction generally perpendicular to said plurality of ribs, said outlet rib defining a space between said first and second walls whereby to define an outlet in communication with said constantly reversing passage.

5. An irrigation device as claimed in claim 4 wherein alternate ones of said plurality of ribs extend respectively from said first and second walls as an integral part thereof and wherein one pair of said plurality of ribs extending from one of said walls is spaced a distance so as to closely receive a rib extending from the other of said walls, whereby to provide for proper alignment of all remaining ribs of said plurality of ribs.

6. An irrigation device, as claimed in claim 1, wherein said first wall comprises the outside surface of an irrigation pipe and said second wall comprises a flexible plastic element adapted to be assembled on and generally conform to the outside surface of said irrigation pipe.

7. An irrigation device, as claimed in claim 6, wherein said passage-defining means comprises a plurality of ribs extending from said second wall and integral therewith, said ribs being parallel, one to another, said ribs being spaced so as to define a plurality of adjacent, parallel conduits of constantly reversing configuration.

8. An irrigation device as claimed in claim 7, wherein said inlet means comprises a tube extending from said second wall and communicating with said passage.

9. An irrigation device as claimed in claim 8 and further including an outlet rib extending from said second wall substantially transverse to said plurality of ribs, the height of said outlet rib being less than the height of said plurality of ribs.

10. An irrigation device as claimed in claim 7 and including a pair of locking elements at opposite side edges of said second wall and a locking member engageable with said locking elements for securing said irrigation device about the external surface of an irrigation pipe in watertight relationship therewith.

11. An irrigation device as claimed in claim 10 wherein each of said locking elements is separated from an associated side edge of said second wall by a thinned section of plastic material, whereby to define a hinge.

12. An irrigation device as claimed in claim 11 wherein said locking elements are tapered and are biased toward one another by said locking member, said locking member being slideably mounted on said tapered locking elements, the amount of biasing force being related to the position of said locking member.

* * * * *